Jan. 19, 1932.  L. R. KUBIAS  1,841,826
SIGNALING DEVICE FOR AUTOMOBILES
Filed June 25, 1928    2 Sheets-Sheet 1
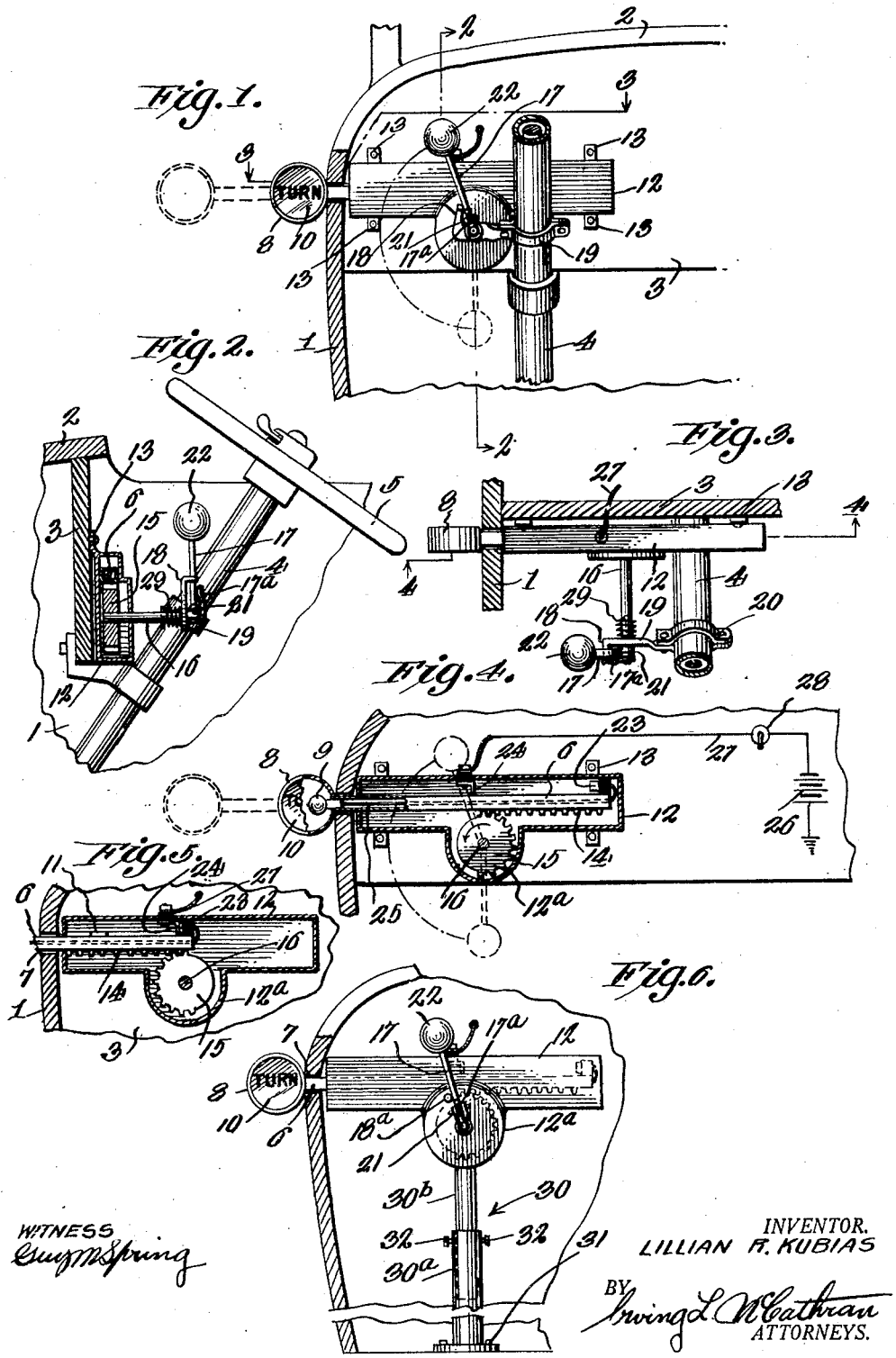
WITNESS
INVENTOR.
LILLIAN R. KUBIAS
BY
ATTORNEYS.

Jan. 19, 1932. L. R. KUBIAS 1,841,826
SIGNALING DEVICE FOR AUTOMOBILES
Filed June 25, 1928 2 Sheets-Sheet 2
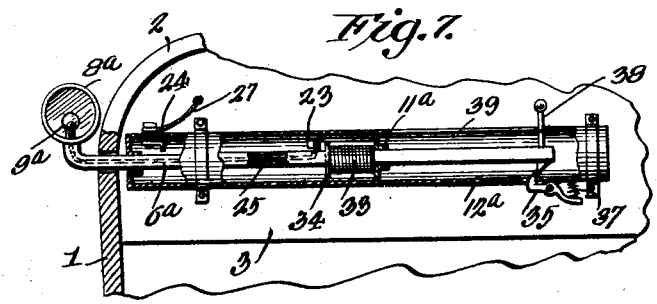
INVENTOR.
LILLIAN R. KUBIAS
BY Irving L. Cathran
ATTORNEYS.

Patented Jan. 19, 1932

1,841,826

UNITED STATES PATENT OFFICE

LILLIAN R. KUBIAS, OF CEDAR RAPIDS, IOWA

SIGNALING DEVICE FOR AUTOMOBILES

Application filed June 25, 1928. Serial No. 288,111.

This invention relates to signaling devices for automobiles, and has for one of its objects to provide a novel, simple and inexpensive device of this character which shall be adapted to be readily applied to an automobile and shall embody a signaling arm extending outwardly from a side of the automobile, a lamp arranged at the outer end of the arm, and means by which the lamp may be easily and quickly lighted and extinguished.

A further object of the invention is to provide a signaling device of the character stated wherein the signaling arm shall be arranged for horizontal movement outwardly with respect to the automobile into signaling position and for movement inwardly with respect to the automobile into non-signaling position, and means through the medium of which a driver may easily and quickly project or retract the signaling arm without releasing the steering wheel.

The invention has for a further object to provide a signaling device of the character stated which shall comprise means for efficiently bracing the signal arm in position upon a support.

The invention has for a further object to provide a signaling device of the character stated which shall comprise means adapted to limit the outward movement of the signaling arm in a manner to prevent injury to the operating parts for the arm and to the circuit closing and breaking means.

With the foregoing and other objects in view, the nature of which will appear as the description proceeds, the invention consists in the construction, combination and arrangement of parts hereinafter fully described and claimed, and illustrated in the accompanying drawings, wherein:

Figure 1 is a view partly in rear elevation and partly in vertical section of the front portion of an automobile equipped with a signaling device constructed in accordance with my invention, the signaling arm being shown by broken lines in signaling position and by solid lines in non-signaling position.

Figure 2 is a sectional view taken on the planes designated by the line 2—2 of Figure 1.

Figure 3 is a sectional view taken on the horizontal planes indicated by the line 3—3 of Figure 1.

Figure 4 is a sectional view taken on the vertical planes indicated by the line 4—4 of Figure 3.

Figure 5 is a view similar to Figure 4 with the signaling arm in signaling position.

Figure 6 is a view similar to Figure 1 illustrating a slightly modified form of the signaling device.

Figure 7 is a view similar to Figure 4 illustrating a further modified form of the signaling device, the signaling arm being shown in non-signaling position.

Figure 8 is a view similar to Figure 7 with the signaling arm in signaling position.

Figure 9 is a view similar to Figure 1 illustrating a further modified form of the device.

Figure 10 is a view similar to Figure 9 illustrating a further modified form of the device.

Figure 11 is a similar view illustrating a still further modified form of the device.

Figure 12 is a view in side elevation illustrating the manner in which the signaling arms of the devices shown in Figures 10 and 11 may be coupled together.

Referring in detail to the drawings, 1 designates the front portions of the sides, 2 the cowl, 3 the instrument board, 4 the steering column and 5 the steering wheel of an automobile.

The signaling device, as shown in Figures 1 to 6 comprises a hollow signaling arm 6 which is arranged for horizontal inward and outward movement with respect to a side of the automobile, the side being provided with an opening 7 for the passage of the arm. The outer end of the arm 6 is provided with a casing 8 in which an incandescent electric lamp 9 is arranged and which is provided with front and rear panels of colored glass and bearing the word "turn". The inner portion of the arm 6 is slidably supported by guides 11 within a casing 12 which is secured, as at 13, to the instrument board 3. The arm 6 is provided at its lower side with rack teeth 14 with which a pinion 15 engages.

The pinion 15 is fixed to a shaft 16, and to receive the pinion the casing 12 is provided with a downwardly offset portion 12ª. The shaft 16 is journaled in the casing portion 12ª, and it extends rearwardly therefrom to a point near the left side of the steering column 4. Secured to the rear end of the shaft 16 is a lever 17 through the medium of which the pinion 15 may be turned to effect the projection of the arm 6 into signaling position or its retraction into non-signaling position.

When the arm 6 is in non-signaling position, the lever 17 engages a stop lug 18 projecting rearwardly from a bracket arm 19 which is secured, as at 20, to the steering column 4 and in which the shaft 16 is also journaled. The lever 17 is secured to the shaft 16, as at 21, for limited forward and rearward pivotal movements so as to permit the lever to be moved into and out of engagement with the stop lug 18. A spring 17ª secured to the shaft 16 and bearing against the arm 17 yieldingly holds the arm against rearward pivotal movement so as to prevent it from moving accidentally out of engagement with the stop lug 18. A weight 22 which is secured to the free or outer end of the lever 17 functions to effect the movement of the arm 6 into signaling position when the lever is withdrawn from engagement with the stop lug 18. The lever 17 is supported in an upwardly and outwardly inclined position by the stop lug 18, as shown in Figures 1, 3 and 4, and it moves, when released, to the broken line position shown in Figures 1 and 4, and during this movement thereof the arm 6 is moved into signaling position.

When the arm 6 is in signaling position, it extends beyond the side of the car far enough to permit the illuminated word "turn" to be easily seen by the drivers of other automobiles. During the final phase of the movement of the arm 6 into signaling position, the lamp 9 thereof is lighted through the medium of a switch which consists of a member 23 secured to and insulated from the rear end of the arm and a member 24 secured to and insulated from the casing 12, and arranged in the path of the member 23. The switch member 23 is connected to the lamp by a conductor 25 which passes through the arm 6. The wire 25 is connected to one terminal of the lamp 9, and the other terminal thereof is grounded to the arm 6. The lamp 9 is supplied with current from the storage battery 26 of the automobile. One side of the battery 26 is grounded, and the other side thereof is connected to the switch member 24 by a conductor 27 in which is arranged a manually operable switch 28. The switch members 23 and 24, while closing the circuit of the lamp 9 the instant that the arm 6 reaches its signaling position, serves to break the lamp circuit during the first phase of the movement of the arm into non-signaling position.

A coil spring 29 is arranged on the shaft 16 and having its ends fixed to the shaft and bracket arm 19, is tensioned during the movement of the arm 6 into signaling position, and as the result constitutes a yielding stop for the movement of the arm in this direction and prevents injury to the arm and the parts associated therewith.

The arm 6 may be easily moved into non-signaling position by grasping the weight 22 and swinging the lever 17 upwardly, and by moving the lever 17 into engagement with the stop lug 18 the arm will be held in non-signaling position from which position it will automatically move into signaling position on the disengagement of the lever from the stop lug. The lever 17 may be easily disengaged from the stop lug by one hand, leaving the other hand engaged with the steering wheel 5.

Instead of securing the device to the instrument board, it may be supported from the floor of the automobile by a pedestal 30, as shown in Figure 6. The pedestal 30 is secured to the floor of the automobile, as shown at 31, and it comprises telescopically associated parts 30ª and 30ᶜ to permit its height to be varied and thus adapt the device for use in connection with automobiles of different sizes. The pedestal parts 30ª and 30ᵇ are secured against axial movement relatively by set screws 32. In this form of the device, the stop lug, which is here designated 18ª, is secured to the casing in which the signaling arm is slidably arranged. All of the remaining parts of this device are similar to the corresponding parts of the device shown in Figures 1 to 5, and are designated by the same reference characters.

The device shown in Figures 7 and 8 which may be secured to the instrument board or mounted upon the pedestal 30, comprises a signaling arm 6ª which is of angular formation in cross section and provided at its outer end with a casing 8ª in which a lamp 9ª is arranged. The arm 6ª is slidably supported within the casing 12ª by guides 11ª which are of angular formation in cross section to hold the arm against rotation with respect to the casing.

A coil spring surrounding the arm 6ª and positioned between one of the guides 11ª and a pin 34 carried by the arm, is compressed when the arm is in non-signaling position, and the arm is held in this position by a latch 35 pivoted to the casing 12ª and engaging a lug 36 carried by the arm. The latch 35 is held in active position by a spring 37, and automatically engages the lug 36 during the final phase of the movement of the arm 6ª into non-signaling position. The arm 6ª is adapted to be moved into this position by a handle 38 secured thereto and passing through a slot 39 in the upper side of the casing 12ª. This signaling arm may be released by merely retracting the latch 35, and this may be done by one hand while the other is in engagement with the steering wheel. After the retraction of the latch 35 the arm 6ª will be moved into signaling position by the spring 33. The switch for closing and breaking the lamp circuit is similar to the switch shown in Figures 1 to 6, and the several parts thereof are designated by the same reference characters.

While each signaling device is shown at the left side of the automobile and adapted to permit the driver to indicate his or her intention to make a left turn, it will be understood that the automobile may be equipped with a pair of each of the devices, one at the left and the other at the right side so as to enable the driver to indicate his or her intention to make a turn either to the right or to the left. The signaling devices occupy a position at the front of the automobile adjacent their cowls and due thereto will, when in signaling position, be clearly visible to the drivers of other automobiles.

The signaling device shown in Figure 9, comprises an arm 6ᵇ fixedly secured to the automobile at a point adjacent the cowl and extending laterally therefrom. The arm 6ª has its inner end extending through the side of the automobile, and is secured in place by nuts 40 engaging the arm and contacting with the inner and outer surfaces of the side of the automobile. The arm 6ᵇ is hollow and is provided at its outer end with a lamp casing 41. One terminal of the lamp 42 is grounded to the arm 6ᵇ, and a conductor 43 is connected to the other terminal of the lamp and passes through the arm 6ᵇ. The conductor 43 extends from the storage battery 44 of the automobile which is grounded, and arranged therein is a switch 45 which is mounted on the cowl 3 of the automobile within convenient reach of the driver. It will be seen that when the driver wishes to indicate his or her intention to make a turn it is only necessary to close the switch 45. If desired the automobile may be equipped with two of these signals, one at the left and the other at the right side thereof, as suggested in Figures 10 and 11. The signals may be supported by pedestals 30ª similar to the pedestals 30, as shown in Figure 10, or secured to the instrument board 3 by brackets 46, as shown in Figure 11. If desired the inner ends of the arms 37ª may be connected together by a coupling 47, as shown in Figure 12, and when the arms are connected in this manner they may be secured to the automobile in the manner shown in Figure 10, or in the manner shown in Figure 11.

As shown in Figure 10, the arms 6ᵇ extend through apertures formed in the support or body 1, and the inwardly extending ends of these arms 6ᵇ are supported adjustably upon the adjustable pedestals 30ª, these pedestals being capable of adjustment so as to bind the arms 6ᵇ within the apertures formed in the support and through which the arms extend. In this way, the arms 6ᵇ may be firmly bound in engagement with the body 1 and held against vibration through the adjustment of the pedestals 30ª.

While I have described the principle of operation of the invention, together with the devices which I now consider to be the best embodiments thereof, I desire to have it understood that the devices shown are merely illustrative, and that such changes may be made in each of them when desired as are within the scope of the invention as claimed.

What I claim is:

In combination with a support having a transverse aperture formed therein, of an elongated signal supporting arm slidably mounted through said aperture, said arm extending well within said support and an adjustable pedestal engaging said arm and holding the arm in an adjusted longitudinal position, said adjustable pedestal capable of being adjusted to force the inner end of said arm upwardly whereby said arm will bind in said aperture formed in said support and hold said arm in binding engagement with the support against vibration.

In testimony whereof I affix my signature.

LILLIAN R. KUBIAS.